US010164505B2

(12) United States Patent
Lass et al.

(10) Patent No.: US 10,164,505 B2
(45) Date of Patent: Dec. 25, 2018

(54) FORCED AIR COOLING OF VACUUM MOTOR CONTROL

(71) Applicant: Nidec Motor Corporation, St. Louis, MO (US)

(72) Inventors: David E. Lass, Addison, IL (US); Gregory A. Davis, Haubstadt, IN (US); Michael E. Williams, Princeton, IN (US); Dale R. Wilson, Princeton, IN (US)

(73) Assignee: Nidec Motor Corporation, St. Louis, MO (US)

( * ) Notice: Subject to any disclaimer, the term of this patent is extended or adjusted under 35 U.S.C. 154(b) by 357 days.

(21) Appl. No.: 15/000,996

(22) Filed: Jan. 19, 2016

(65) Prior Publication Data
US 2017/0207681 A1 Jul. 20, 2017

(51) Int. Cl.
H02K 5/20 (2006.01)
H02K 9/06 (2006.01)
H02K 11/33 (2016.01)
H02K 5/10 (2006.01)
H02K 7/14 (2006.01)

(52) U.S. Cl.
CPC ............. *H02K 9/06* (2013.01); *H02K 5/20* (2013.01); *H02K 11/33* (2016.01); H02K 5/10 (2013.01); H02K 7/14 (2013.01)

(58) Field of Classification Search
CPC .. H02K 5/10; H02K 5/20; H02K 9/06; H02K 11/30; H02K 11/0094
See application file for complete search history.

(56) References Cited

U.S. PATENT DOCUMENTS

| 4,668,898 A | * | 5/1987 | Harms | H02K 11/33 310/227 |
| 4,883,982 A | * | 11/1989 | Forbes | F04D 25/08 310/156.26 |
| 5,068,555 A | * | 11/1991 | Oberdorfer-Bogel | A47L 9/2842 15/326 |
| 6,031,306 A | * | 2/2000 | Permuy | H02K 11/33 310/60 A |
| 6,107,708 A | * | 8/2000 | Yamaguchi | B60H 1/00457 310/58 |

(Continued)

FOREIGN PATENT DOCUMENTS

EP 1533883 A1 5/2005

Primary Examiner — Dang Le
(74) Attorney, Agent, or Firm — Hovey Williams LLP

(57) ABSTRACT

A motor assembly is provided for powering a blower operable to generate fluid flow. The motor assembly includes a motor, a controller assembly, and a flow director. The motor includes a rotor rotatable about an axis. The rotor includes a rotatable support body, a plurality of arcuately spaced apart magnets, and a magnet retention ring at least in part securing the magnets relative to the support body. The controller assembly includes a controller and a controller case at least substantially housing the controller. The controller extends lengthwise to present opposite first and second sides at least in part spaced from the controller case. The flow director and the controller case cooperatively direct fluid received from the blower along a flow path that at least in part extends along each of the first and second sides of the controller.

22 Claims, 7 Drawing Sheets

(56) References Cited

U.S. PATENT DOCUMENTS

| | | | |
|---|---|---|---|
| 2002/0079755 A1* | 6/2002 | Sunaga | H02K 11/33 310/67 R |
| 2005/0121986 A1* | 6/2005 | Matsuki | H05K 1/0203 310/64 |
| 2014/0265664 A1* | 9/2014 | Camilleri | H02K 15/14 310/59 |
| 2016/0204676 A1* | 7/2016 | Ziegler | H02K 9/06 392/379 |

* cited by examiner

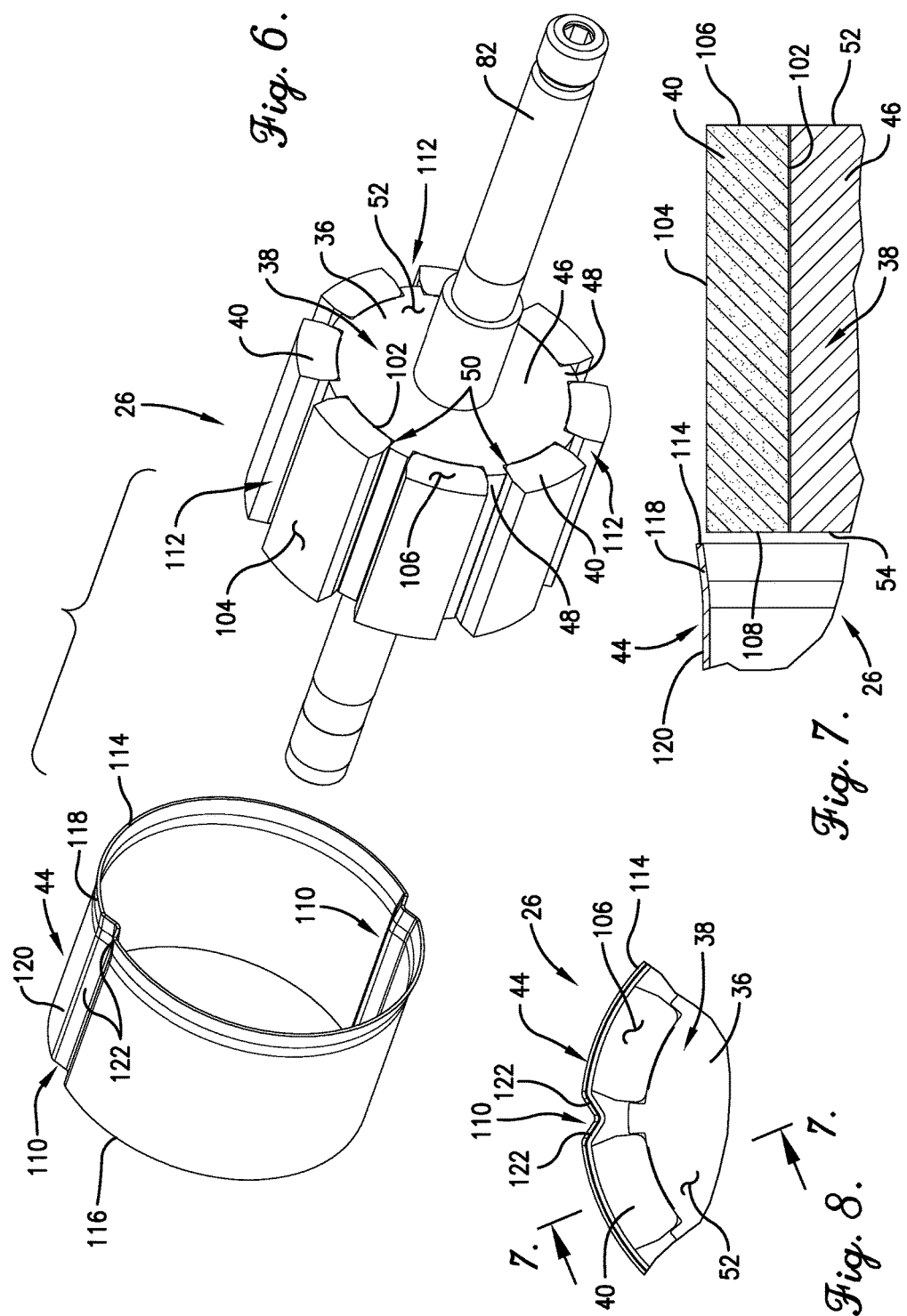

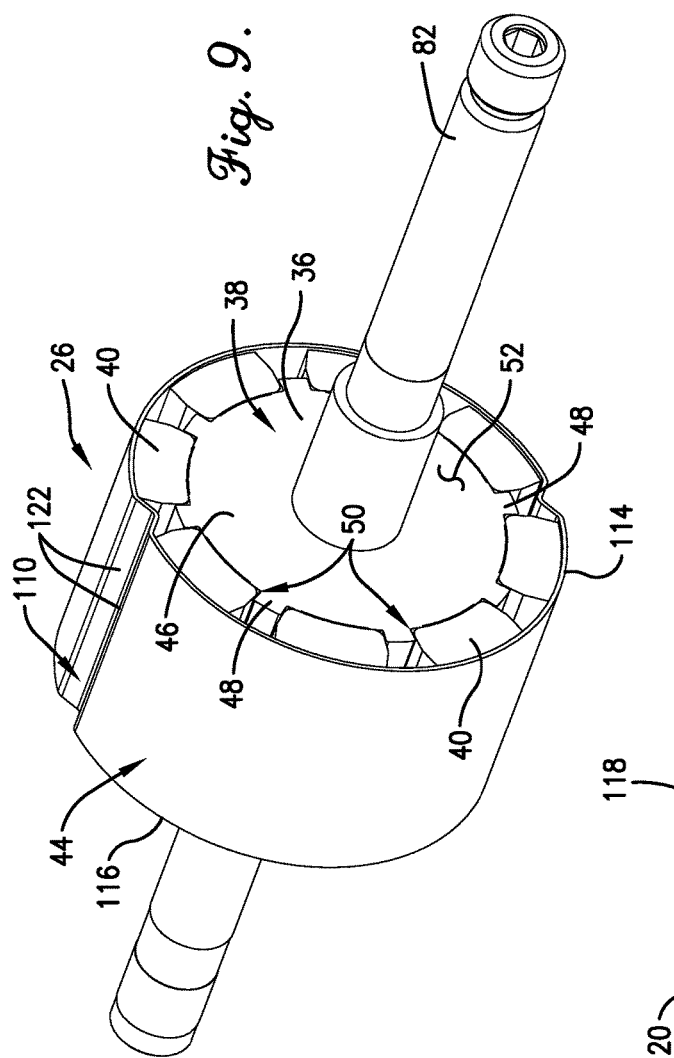
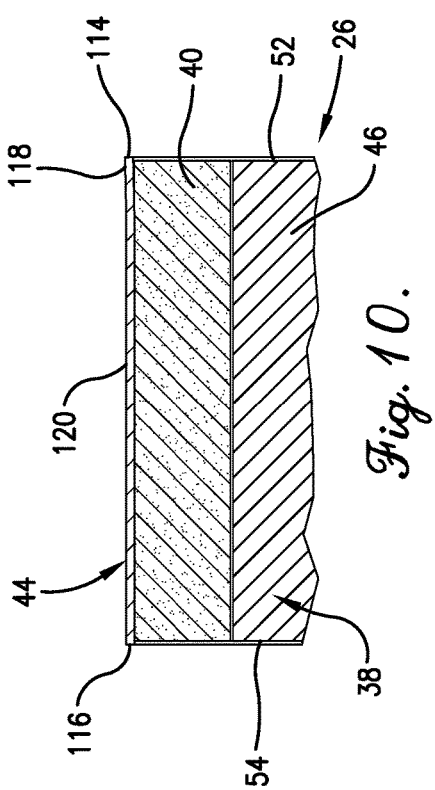

FORCED AIR COOLING OF VACUUM MOTOR CONTROL

CROSS-REFERENCE TO RELATED APPLICATION

The present application is filed contemporaneously with U.S. patent application Ser. No. 15/000,990, entitled ROTOR MAGNET RETENTION RING, filed Jan. 19, 2016. The entire disclosure of the aforementioned contemporaneously filed application is hereby incorporated by reference herein.

BACKGROUND OF THE INVENTION

1. Field of the Invention

The present invention relates generally to an electric motor for use in a machine. More specifically, the present invention concerns a motor including a control system.

2. Discussion of the Prior Art

Those of ordinary skill in the art will appreciate that electric motors are used in a variety of applications, including, but not limited to, appliances (such as exercise bicycles, rowing machines, ceiling fans, dishwashers, washing machines, and vacuum cleaners) and vehicles (such as cars and golf carts).

Such motors oftentimes include a control system that generates heat and/or is subjected to undesirably high environmental temperatures. It is therefore desirable in some instances to provide means of cooling at least some of the components of the control system.

SUMMARY

According to one aspect of the present invention, a motor assembly is provided for powering a blower operable to generate fluid flow. The motor assembly comprises a motor, a controller assembly, and a flow director. The controller assembly includes a controller configured to at least in part control the motor and a controller case at least substantially housing the controller. The controller extends lengthwise to present opposite first and second sides at least in part spaced from the controller case. The flow director is operable to receive fluid flow from the blower. The flow director and the controller case are operable to cooperatively direct fluid received from the blower along a flow path. The flow path at least in part extends along each of the first and second sides of the controller.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 6 is an exploded perspective view of the rotor of the motor assembly of FIGS. 1-5 prior to assembly;

FIG. 7 is a fragmentary, cross-sectional side view of the rotor of FIG. 6 prior to assembly, particularly illustrating the pre-assembly relative sizing of the main and flared portions of the ring relative to the magnet outer diameter;

FIG. 8 is a fragmentary top view of the rotor of FIGS. 6 and 7 after assembly, particularly illustrating the placement of an expansion joint relative to the adjacent magnets;

FIG. 9 is a perspective view of the rotor of FIGS. 6-8 after assembly; and

FIG. 10 is a fragmentary, cross-sectional side view of the rotor of FIGS. 6-9 after assembly, particularly illustrating the post-assembly relative sizing of the main and flared portions of the ring relative to the magnet outer diameter.

Figure 1:
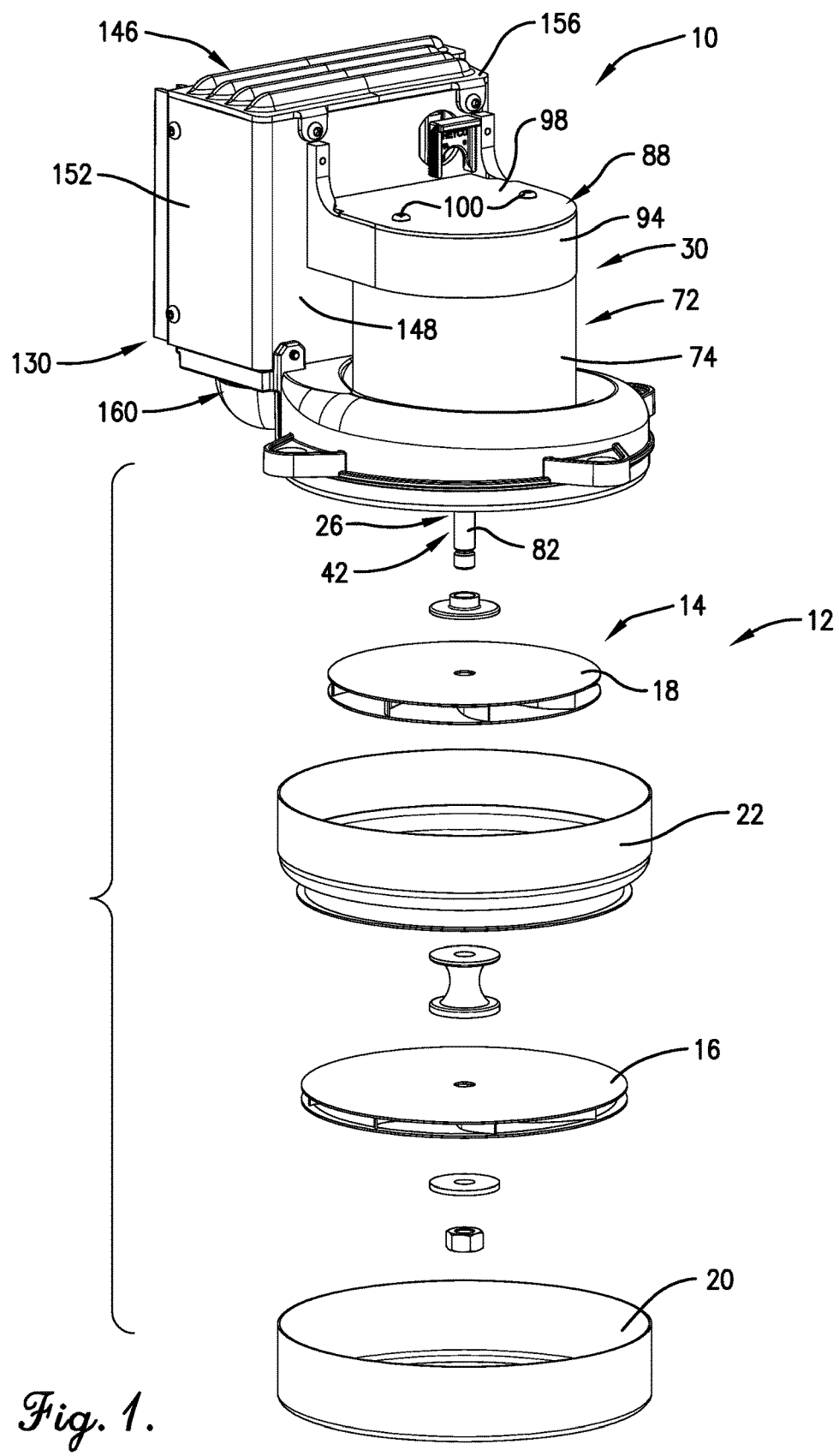
FIG. 1 is an exploded perspective view of a blower motor assembly constructed in accordance with a preferred embodiment of the present invention.
Figure 2:
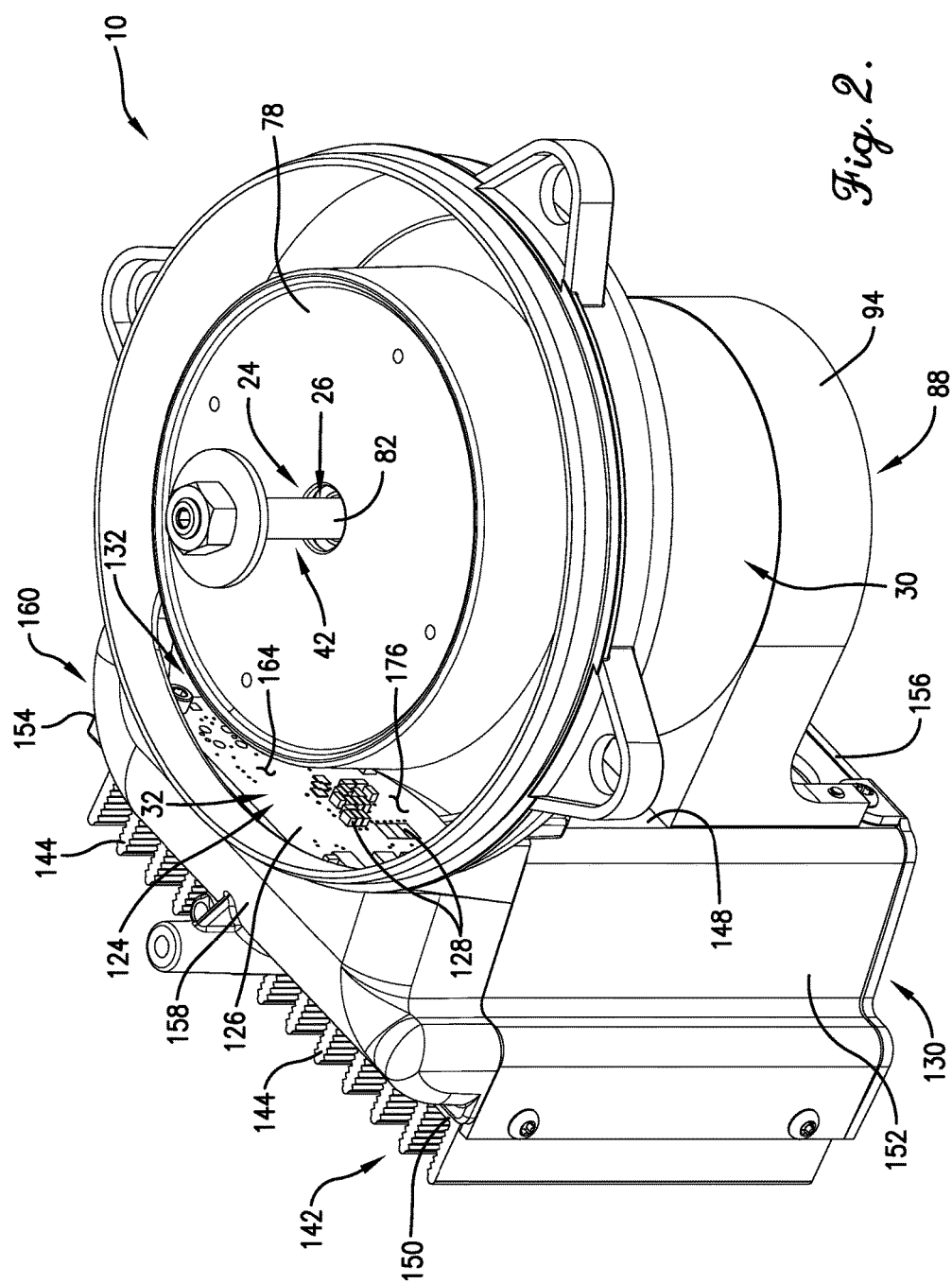
FIG. 2 is a bottom perspective view a portion of the blower motor assembly of FIG. 1, particularly illustrating the relative positioning of the flow director and the controller.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless otherwise specified or made clear, the directional references made herein with respect to the drawings and/or to components of the invention are used solely for the sake of convenience and should be understood only in relation to each other. For instance, a component might in practice be oriented such that components referred to as "top" and "bottom" or "upper" and "lower" are sideways, angled, inverted, etc. relative to the chosen frame of reference.

Machine Overview

With initial reference to FIG. 1 an electric motor assembly 10 is provided for use in a machine 12. The machine 12 is preferably a vacuum cleaner for use in a vehicle (most preferably, a vacuum cleaner for use in an automobile), although use of the motor assembly in an alternative machine and/or application is permissible with respect to certain aspects of the present invention.

The machine 12 preferably includes several components configured to work cooperatively with the motor assembly 10. For instance, the machine 12 preferably includes a blower 14 including first and second stage blower wheels 16 and 18, respectively, housed in first and second stage cans 20 and 22, respectively.

The motor assembly 10 is preferably operable to power the blower 14 to generate fluid flow. More particularly, as will be discussed in greater detail below, the blower wheels 16 and 18 preferably direct fluid (most preferably air) toward the motor assembly 10.

Motor Assembly Overview

The motor assembly 10 preferably broadly includes a motor 24 including a rotor 26 and a stator 28; a housing 30; and a controller assembly 32.

The rotor 26 is rotatable about an axis. In a preferred embodiment, as shown, the stator 28 at least substantially circumscribes the rotor 26, such that the motor 24 is an inner rotor motor. It is permissible according to some aspects of the present invention, however, for the motor to be an outer rotor motor (i.e., the rotor at least substantially circumscribes the stator) or a dual rotor motor (i.e., the stator is at least substantially disposed radially between inner and outer rotor portions).

The rotor 26 and the stator 28 preferably define a thin, circumferentially extending gap 34 therebetween.

As will be discussed in greater detail below, the rotor 26 preferably includes a rotor support body 36 (most preferably a central core 38), a plurality of magnets 40, and a shaft assembly 42 defining a rotational axis for the rotor. The rotor 26 further preferably includes a generally arcuate magnet retention sleeve or ring 44 at least in part securing the magnets 40 relative to the support body 36.

In a preferred embodiment, the rotor 26 is generally cylindrical in form. The rotor core 38 is likewise preferably generally cylindrical in form and defines an axis that is coaxial with the overall rotation axis of the rotor.

The rotor core 38 preferably comprises steel and may be of either solid or laminated construction. The rotor core may also be segmented in form. However, it is permissible without departing from the scope of some aspects of the present invention for any one or more of a variety of suitable materials and/or construction methods to be used for the rotor core.

The rotor core 38 preferably includes a main body 46 and a plurality of arcuately spaced apart projections 48 extending generally radially outwardly (in the preferred inner rotor motor embodiment) from the main body 46.

The main body 46 and each adjacent pair of the projections 48 cooperatively define a magnet-receiving space 50 therebetween. As will be discussed in greater detail below, the magnets 40 are preferably at least in part received in corresponding ones of the magnet-receiving spaces 50 and secured relative to the rotor core 38 to rotate therewith.

The magnets 40 are each preferably permanent magnets comprising neodymium or ferrite, although other magnet types and/or compositions are permissible according to some aspects of the present invention.

Furthermore, the magnets 40 are preferably sized and shaped so as to at least in part complement the corresponding magnet-receiving spaces 50. More particularly, the magnets 40 are preferably sized and shaped to complement the adjacent surfaces of the main body 46, the projections 48, and the ring 44. For instance, in a preferred embodiment, as illustrated, the magnets 40 are slightly circumferentially curved but are generally rectangularly prismatic in form.

In a preferred embodiment, the rotor core 38 presents a pair of opposite, axially spaced apart upper and lower end faces 52 and 54 defining corresponding axial end margins of the rotor core 38. The end faces 52 and 54 are preferably at least substantially planar and parallel with each other, although non-parallel and/or non-planar surfaces are permissible according to some aspects of the present invention.

The stator 28 preferably includes a stator core 56 and a plurality of coils 58 wound about the stator core 56. Furthermore, as will be discussed in greater detail below, it is permissible for the stator to include an electrically insulative covering or coating 60 between the stator core 56 and the coils 58.

In a preferred embodiment, the stator 28 is generally toroidal in form. The stator core 56 is likewise preferably generally toroidal in form and defines an axis of the stator 28. Preferably, the axis of the stator 28 is coaxial with that of the rotor 26. However, it is permissible according to some aspects of the present invention for the axes to be non-coaxial.

The stator core 56 preferably comprises steel and may be of either solid or laminated construction. The stator core may also be segmented in form. However, it is permissible without departing from the scope of some aspects of the present invention for any one or more of a variety of suitable materials and/or construction methods to be used for the stator core.

Furthermore, the stator core 56 preferably presents an upper end face (not shown) and a lower end face 64 opposite and axially spaced apart from the upper end face (not shown). The upper end face (not shown) and the lower end face preferably define corresponding axial end margins of the stator core 56. The upper end face (not shown) and the lower end face 64 are preferably at least substantially planar and parallel with each other, although non-parallel and/or non-planar surfaces are permissible according to some aspects of the present invention. The coils 58 preferably extend beyond the axial end margins of the stator core defined by the upper end face (not shown) and the lower end face 64.

The stator core 56 preferably includes an annular yoke (not shown) and a plurality of arcuately spaced apart teeth 66 extending at least generally radially from the yoke. Each pair of adjacent teeth 66 preferably defines a wiring slot 68 therebetween.

Preferably, in keeping with the preferred inner rotor motor design, the teeth 66 extend radially inwardly from the yoke, although it is permissible according to some aspects of the present invention for the teeth to extend generally outwardly (e.g., in the case of an outer rotor motor).

The coils 58 preferably comprise electrically conductive wiring 70 wound about the stator core 56. The wiring 70 is preferably wound about each of the teeth 66 through the wiring slots 68 to encircle each tooth 66 and form the coils 58, with each of the coils 58 corresponding to one of the teeth 66.

The wiring 70 preferably comprises copper, although aluminum or any one or more of a variety of electrically conductive materials may be used without departing from the scope of the present invention.

The wiring 70 is preferably wound in such a manner that the motor 24 is a three (3) phase motor. Alternative phasing is permissible within the scope of the present invention, however.

In a preferred embodiment, the insulative covering 60 comprises a plurality of end caps 61. However, use of any one or more of a variety of insulation means, including but not limited to the use of electrically insulative overmolding, powder-coating, inserts, and/or liners, is permissible according to some aspects of the present invention. It is also permissible according to some aspects of the present invention for the stator core to be devoid of electrical insulation.

The covering 60 preferably comprises an at least substantially electrically insulative material. In a preferred embodiment, for instance, the end caps 61 comprise a molded synthetic resin material. However, any one or more of a variety of substantially electrically insulative materials may be used without departing from the scope of the present invention.

As noted previously, the motor assembly 10 further preferably includes the housing 30. The housing 30 preferably includes a motor case 72 comprising a shell 74, an upper endshield 76, and a lower endshield 78. The shell 74 and the upper and lower endshields 76 and 78, respectively, preferably define a motor chamber 80 that at least substantially receives the stator 28 and the rotor 26.

In a preferred embodiment, the shell 74 extends generally circumferentially about the stator 28. It is permissible according to some aspects of the present invention, however, for the shell to extend in such a manner as to provide one or more flat sides, in contrast to the preferred generally cylindrical form, or to be otherwise alternatively shaped.

The shell 74 preferably extends generously continuously. However, it is permissible according to some aspects of the present invention for the shell to include openings or slots therethrough. For instance, openings or slots may provided for ventilation and/or access purposes.

The shaft assembly 42 preferably includes a shaft 82. The shaft assembly 42 further preferably includes an upper bearing assembly (not shown) and a lower bearing assembly 86 cooperatively rotatably supporting the shaft 82. The upper and lower endshields 76 and 78 preferably support respective ones of the upper bearing assembly (not shown) and the lower bearing assembly 86. Alternative or additional bearing assembly supports may be provided without departing from the scope of the present invention, however.

In a preferred embodiment, as illustrated, the endshields 76 and 78 are at least substantially solid in construction, such that ingress of contaminants therethrough is at least generally prohibited. It is permissible according to some aspects of the present invention, however, for either or both of the endshields to define openings therethrough.

The housing 30 further preferably includes an encoder box 88 defining an encoder chamber 90. An encoder 92 is preferably received in the encoder chamber 90. Those of ordinary skill in the art will appreciate that the encoder 92 may be used to sense motor conditions, such as speed, direction of rotation, etc.

Preferably, the encoder box 88 includes the upper endshield 76, a generally U-shaped first sidewall 94, a generally straight second sidewall 96, and a cover 98. The cover 98 is preferably removably secured (e.g., by means of screws 100) to enable easy access to the encoder chamber 90. Other encoder box configurations fall within the scope of the present invention, however.

Rotor Magnet Retention

As noted previously, the rotor 26 preferably includes the rotor core 38, the plurality of magnets 40, the shaft assembly 42, and the magnet retention sleeve or ring 44. As also briefly described above, the rotor core 38 preferably defines a plurality of arcuately spaced apart, radially extending projections 48 alternately arranged with the magnets 40.

In the preferred inner rotor motor configuration, the projections 48 extend radially outwardly from the main body 46 of the rotor core 38, with the magnets 40 thus cooperatively circumscribing the main body 46 of the rotor core 38. The magnet retention ring 44 in turn preferably extends circumferentially to circumscribe the magnets 40. That is, the magnets 40 are preferably disposed at least substantially radially between the support body and the ring.

The magnet retention ring 44 is preferably generally arcuate in form and extends continuously circumferentially, although alternate shapes and/or discontinuities are permissible according to some aspects of the present invention.

As noted previously, the magnets 40 are preferably sized and shaped so as to complement the adjacent surfaces of the main body 46, the projections 48, and the ring 44. In greater detail, in a preferred embodiment, each magnet 40 extends radially from the support body 36 (i.e., the rotor core 38 in a preferred embodiment, as illustrated) to present radially opposite inner (proximal) and outer (distal) surfaces 102 and 104, respectively. The inner and outer surfaces 102 and 104 are preferably arcuate to match the curvature of the adjacent surfaces of the main body 46 and the ring 44, although mismatched surfaces are permissible according to some aspects of the present invention.

Furthermore, the inner surfaces 102 are preferably secured to the rotor core 38 by means of an adhesive (e.g., a glue or tape), although the adhesive may be omitted in some embodiments or replaced with alternate securement means. For instance, the magnets might alternatively be secured by means of latches, overmolding, etc.

The ring 44 preferably at least in part directly abuts the outer surfaces 104 to additionally secure the magnets 40 relative to the rotor core 38. It is permissible according to some aspects of the present invention, however, for the ring 44 to be spaced from the outer surfaces 104 by one or more intermediate structures or materials such as a tape or film.

The projections 48 preferably extend radially outwardly a lesser distance relative to the main body 46 of the rotor core 38 than do to the magnets 40. That is, the outer or distal surfaces 104 of the magnets 40 are preferably spaced radially outwardly from the projections 48. Preferably, the projections 48 extend radially outwardly along less than half of the radial extent of the adjacent magnets 40. Most preferably, the projections 48 extend radially outwardly along less than one third of the radial extent of the adjacent magnets 40.

It is preferred that each magnet 40 also preferably presents axially opposite upper and lower end surfaces 106 and 108. The magnets 40 are preferably sized and positioned so as to be disposed axially between or at least substantially flush with either or both of the end faces 52 and 54 of the rotor core 38. The ring 44 is likewise preferably sized and positioned so as to be disposed axially between or at least substantially flush with either or both of the end faces 52 and 54 of the rotor core 38.

In a preferred embodiment, the ring 44 includes a pair of diametrically opposed expansion joints 110. More particularly, each pair of adjacent magnets 40 preferably defines a slot 112 therebetween, with each of the slots 112 being arcuately aligned with a corresponding one of the projections 48. The joints 110 preferably project radially into respective diametrically opposed ones of the slots 112. As will be discussed in greater detail below, the joints 110 are preferably deformable to facilitate circumferential expansion of the ring 44 during assembly of the rotor 26.

In a preferred embodiment, the ring 44 presents opposite, axially spaced apart first and second ends 114 and 116. Prior to assembly of the rotor 26, the ring 44 preferably includes a flared portion 118 adjacent the first end 114 and a main portion 120 adjacent the second end 116. The flared portion 118 is preferably integrally formed with and immediately adjacent the main portion 120.

Prior to assembly of the rotor 26, the main portion 120 is preferably at least substantially cylindrical in form to present an axially constant initial main portion inner diameter. In contrast, the flared portion 118 preferably extends radially outwardly from the main portion 120 toward the first end 114. The ring 44 thus presents an initial flared portion minimum inner diameter immediately adjacent the main portion and an initial flared portion maximum inner diameter at the first end 114. Whereas the initial flared portion minimum inner diameter is preferably at least substantially equal to the initial main portion inner diameter, the initial flared portion maximum inner diameter is preferably greater than the initial main portion inner diameter.

The outer surfaces 104 of the magnets 40 cooperatively preferably define a magnet outer diameter. The initial flared portion maximum inner diameter is preferably slightly greater than (as shown in exaggerated form in FIG. 8) the magnet outer diameter, while the initial flared portion minimum inner diameter and the initial main portion diameter are preferably smaller than the magnet outer diameter. For instance, in a preferred embodiment, the magnet outer diameter is about one and six hundred thousandths (1.600) inches, while the initial flared portion minimum inner diameter and the initial main portion diameter are slightly smaller at about one and five hundred ninety thousandths (1.590) inches. The initial flared portion maximum diameter, in contrast, is preferably slightly larger at about one and six hundred ten thousandths (1.610) inches. The exact dimensions may vary without departing from the scope of the present invention, however.

It is also permissible according to some aspects of the present invention for the initial flared portion maximum inner diameter to be at least substantially equal to the magnet outer diameter, although the above-described slight oversizing is most preferred.

The ring 44 is preferably operable to expand during assembly of the rotor 26 to accommodate such a discrepancy in diameters. More particularly, during assembly of the rotor 26, the ring 44 is preferably moved axially relative to the magnets 40 and the rotor core 38 such that the first end 114 of the ring 44—i.e, the end presenting the (larger) initial flared portion maximum diameter—slips about the magnets 40 via a loose/slip fit or a tight fit to circumscribe the magnets 40. It is particularly noted that, in a preferred embodiment, the magnets 40 are not tightly toleranced, such that it is possible that some portions of the ring 44 may engage the adjacent magnets 40 via tight fit, while other portions of the ring 44 engage other magnets 40 via a loose fit. Exact sizing of the ring 44 will of course also influence the fit types.

Continued axial shifting of the ring 44 relative to the magnets 40 results in greater and greater amounts of the diametrically shrinking flared portion 118 and, in turn, the (smaller) main portion 120, engaging the magnets 40. The greater magnet outer diameter forces circumferential expansion of these smaller portions of the ring 44. That is, as best shown in FIG. 10, the flared portion 118 and the main body 46 of the ring 44 preferably expand circumferentially during assembly so as to present a final main body inner diameter and a final flared portion minimum inner diameter that are at least substantially equal to the magnet outer diameter. The ring 44 is thus secured relative to the magnets 40 via a tight fit or interference fit.

Preferably, the fit is such that at least five hundred (500) pounds of force are required to remove the ring 44 after assembly of the rotor 26. More preferably, at least six hundred (600) pounds of force are required to remove the ring 44 after assembly of the rotor 26. Most preferably, at least seven hundred (700) pounds of force are required to remove the ring 44 after assembly of the rotor 26.

Preferably, as shown in FIG. 10, the flared portion 118 presents a final flared portion maximum inner diameter adjacent the first end 114 that is only slightly greater than or at least substantially equal to the magnet outer diameter. Thus, the ring 44 preferably presents an at least substantially equal diameter at the first end 114 as at the second end 116 after assembly of the rotor 26.

It is particularly noted that substantial relative oversizing of the flared portion 118 at the first end 114 is undesirable since uniformity of the previously described circumferential gap 34 between the rotor 26 and the stator 28 is most preferred.

As noted previously, the joints 110 preferably facilitate expansion of the ring 44. More particularly, each joint 110 preferably includes a pair of intersecting sides 122 defining a joint angle therebetween. As the ring 44 is moved axially relative to the magnets 40 and is subjected to expansionary deformation forces, the sides 122 of the joints 110 "flatten" to provide larger ring inner diameters. That is, the joint angle formed by the corresponding sides 122 increases.

Although the joint angle preferably varies during the course of assembly of the rotor 26, angles between about ninety (90) degrees and about one hundred forty (140) degrees (occurring at any time during the assembly process) are preferred. Angles between about one hundred (100) degrees and about one hundred thirty (130) degrees are more preferred, and angles near about one hundred fifteen (115) degrees are most preferred. It is also noted that the final joint angle may vary axially along each joint (e.g., as a result of magnet size and/or shape imperfections.

Although provision of a pair of joints 110 is preferred, it is permissible according to some aspects of the present invention for only a single joint or even more than two joints to be provided. Furthermore, if multiple joints are present, such joints are preferably evenly arcuately spaced apart, although non-symmetrical or otherwise irregular arrangements are permissible according to some aspects of the present invention.

In a preferred embodiment, as noted previously, the joints 110 extend into corresponding ones of the slots 112 between adjacent magnets 40. It is most preferable, however, that the joints 110 are also arcuately spaced from the respective adjacent pair of magnets 40 so as to avoid direct contact therewith. That is, damaging "scraping" or other contact between the joints 110 and adjacent magnets 40 is preferably avoided.

In a preferred embodiment, the ring 44 comprises stainless steel. It is permissible according to some aspects of the present invention, however, for one or more alternative materials to be used. Such alternative material or materials should preferably be non-magnetic (or at least substantially non-magnetic), however, and also be amenable to deformation modes including circumferential expansion, as described above.

The ring 44 is also preferably provided with a radial thickness conducive toward appropriate circumferential deformation. For instance, in a preferred embodiment, the ring 44 has a radial thickness of about seventeen thousandths (0.017) of an inch.

Although the above-described preferred embodiment of the ring 44 is best suited for use with an inner rotor motor, a ring using similar principles and/or features might be constructed for use with an outer rotor motor or dual rotor motor. In an outer rotor configuration, for instance, the support body might comprise an outer backing ring and a rotor can rather than a core, with the backing ring circumscribing the magnets and the projections comprising pole pieces being alternatively arcuately arranged with the magnets. An inner magnet retention ring might be provided, with the flared portion flaring inwardly (i.e., tapering) relative to the main body of the ring to facilitate the internal positioning of the ring. Furthermore, the ring would be subjected to circumferential contraction rather than expansion, with the joint angles decreasing during the course of rotor assembly to facilitate such shrinkage.

In a dual rotor configuration, the support body might comprise both inner and outer backing rings and a rotor can, with arcuately inner and outer sets of magnets being positioned adjacent respective ones of the inner and outer backing rings. A pair of magnet retention rings could be provided, with one configured similarly to that described above with respect to the preferred embodiment of the present invention, and the other configured as described above with respect to an alternate outer rotor motor embodiment.

Although any one or more formation techniques for creation of the magnet retention ring 44 are permissible according to some aspects of the present invention, it is preferred that the ring 44 be formed via a cold forming process. More particularly, a cylindrical tube having an inner diameter slightly larger than the magnet outer diameter (e.g., five-thousandths (0.005) inches larger) is initially provided. The tube is then placed in a press that creates both the joints 110 and the flared portion 118.

Furthermore, it is preferred that the rotor assembly method described above is a cold press method. That is, it is preferred that neither the ring 44 nor other components of the rotor 26 are heated during assembly (as would occur in a thermal fitting or hot dropping process, for instance).

It is noted that the above-described preferred process and rotor design are highly advantageous. Among other things, for instance, provision of the deformable joints 110 to accommodate circumferential expansion as the ring 44 is placed about the magnets 40 aids in conformation of the ring 44 to the outer magnet diameter adjacent each of the magnets, including those having irregularities or poor tolerancing. That is, the preferred process and design preferably better accommodate magnet flaws than do other methods and designs (e.g., a thermally fitted, jointless cylindrical sleeve).

Cooling of Motor Control

As noted previously, the motor assembly 10 preferably includes the controller assembly 32. The controller assembly 32 preferably includes a controller 124 for at least in part controlling operation of the motor 24. The controller 124 preferably comprises a printed circuit board 126 on which a plurality of electronic components 128 are mounted. The electronic components 128 preferably include but are not limited to a field-effect transistor, a conductor, and a capacitor.

The controller assembly 32 further preferably includes a controller case 130 defining a controller chamber 132 that at least substantially encloses and houses the controller 124.

Figure 3:
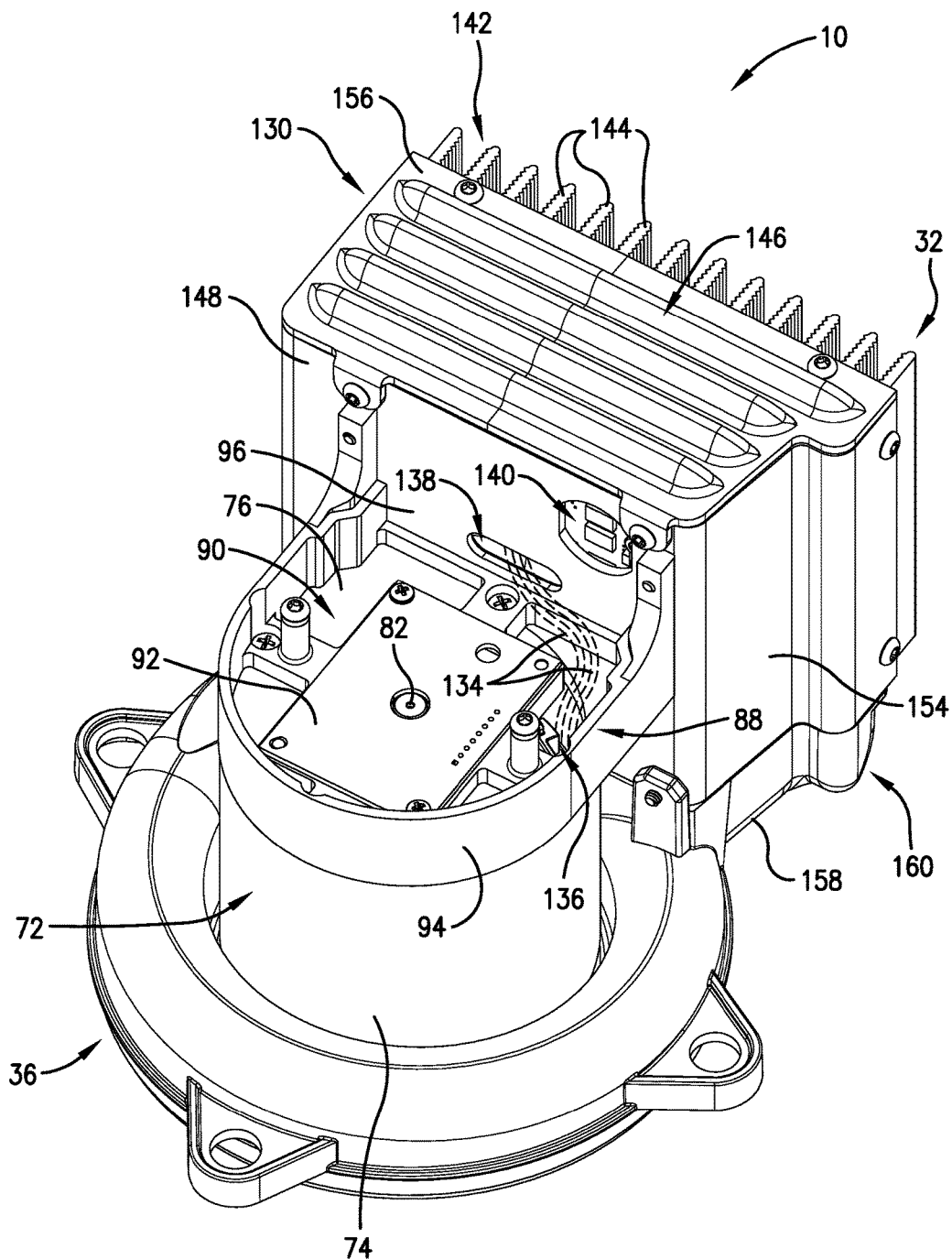
FIG. 3 is a top perspective view of the motor assembly portion of FIG. 2, with the encoder box cover removed.
Figure 4:
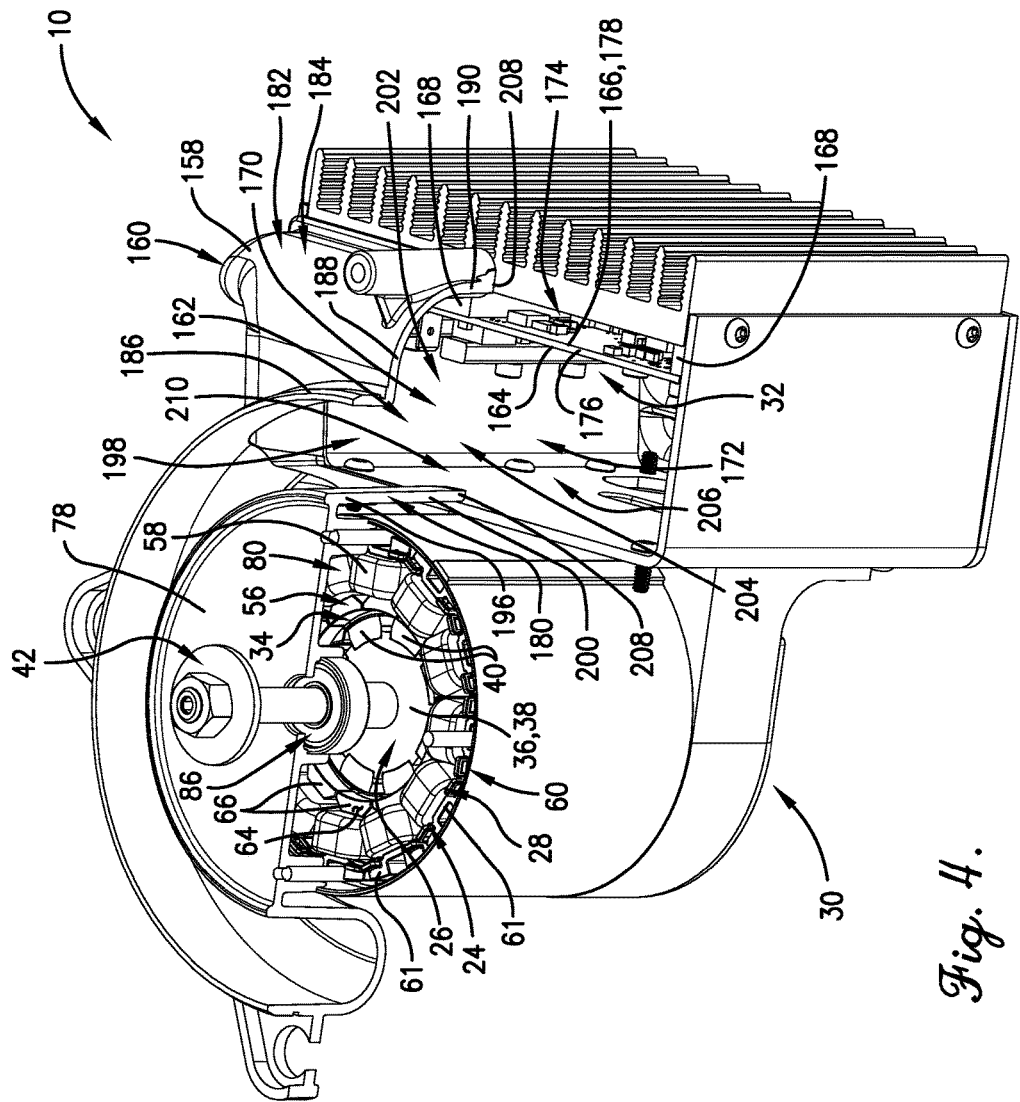
FIG. 4 is a bottom perspective view of the motor assembly portion of FIGS. 2 and 3, particularly illustrating the relative positioning of the flow director and the controller.
Figure 5:
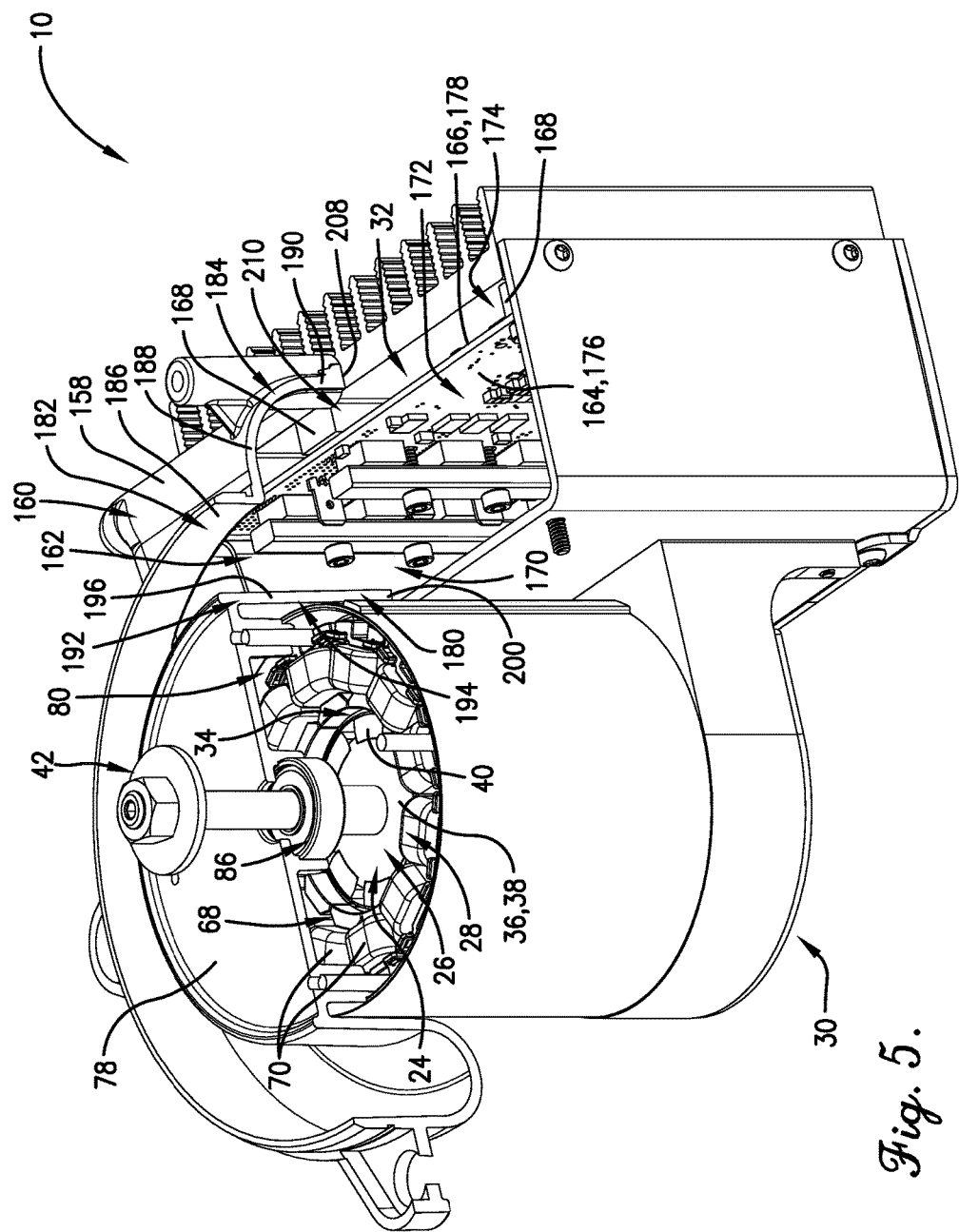
FIG. 5 is another bottom perspective view of the motor assembly portion of FIGS. 2-4, further illustrating the relative positioning of the flow director and the controller.

In a preferred embodiment, as noted previously, the stator coils 58 comprise electrically conductive wiring 70 wound about the stator core 56. The wiring 70 is preferably connected to the controller 124 via electrically conductive connector wiring 134. More particularly, as best shown in FIG. 3, the motor case 72 and the controller case 130 preferably define respective openings 136 and 138 through which the connector wiring 134 extends between the motor 24 and the controller 124 via the encoder chamber 90. An additional opening 140 also preferably provides access between the controller chamber 132 and the encoder chamber 90 (e.g., for routing of additional connector wiring).

The motor 24 is preferably configured to be operable at temperatures up to about eighty-five (85) degrees Celsius. Such high operational temperatures, in addition to heat inherently generated by the electronic components 128 of the controller 124 and other components of the motor 24, make it desirable to cool the controller 124 and associated structures.

For instance, the controller case 130 preferably includes heat-dispersing structures 142 including fins 144. It is permissible for certain aspects of the present invention, however, for the heat-dispersing structures to be alternatively designed or even omitted entirely.

The controller case 130 further preferably includes a shield 146 at least in part preventing ingress of contaminants into the controller chamber 132 and additionally functioning to restrict unintentional user access to the controller chamber 132. It is permissible, however, for shield to be alternatively designed or even omitted entirely.

The controller case 130 preferably features a multi-part construction enabling easy access to the controller 124. Integral construction is permissible, however, without departing from the ambit of the present invention.

The controller case 130 preferably presents opposite inner and outer walls 148 and 150, respectively, as well as sidewalls 152 and 154 extending between the inner and outer walls 148 and 150. The controller case 130 further preferably includes top and bottom walls 156 and 158, respectively.

Preferably, the inner and outer walls 148 and 150, as well as the sidewalls 152 and 154, extend generally axially. Furthermore, the inner and outer walls 148 and 150 are preferably at least substantially parallel to each other. Similarly, the sidewalls 152 and 154 are preferably at least substantially parallel to each other. It is permissible according to some aspects of the present invention, however, for opposite ones of the walls to be skewed or otherwise non-parallel relative to each other. The overall shape of the controller case 130 may also be varied so as to include more or fewer walls.

Furthermore, it is preferred that the controller case 130 presents the second sidewall 96 of the encoder box 88, although other configurations fall within the ambit of the present invention. More particularly, the second sidewall 96 of the encoder box 88 preferably comprises a portion of the inner wall 148 of the controller case 130.

It is also preferred that the inner wall 148 of the controller case 130 extends along the motor case 72. More particularly, the inner wall 148 of the controller case 130 preferably extends generally tangentially relative to the motor shell 74.

In a preferred embodiment, the housing 30 further includes a flow director 160 operable to receive fluid flow from the blower 14. The fluid flow preferably comprises exhaust air from the blower 14. It is permissible according to some aspects of the present invention, however, for the flow director to receive non-exhaust air, an alternative non-air gas (e.g., a refrigerant gas comprising fluorine), or even a liquid or mixed fluid (e.g., a vapor) from the blower. Yet further, it is permissible according to some aspects of the present invention for the fluid received by the flow director to have a non-blower source (e.g., as would be the case for certain non-vacuum motor alternative embodiments).

As will be discussed in greater detail below, the flow director 160 and the controller 124 preferably cooperatively direct fluid received from the blower along a flow path 162 that extends along the controller 124. The fluid is thereby operable to remove heat from the controller 124 by means including convection.

More particularly, the controller 124 is preferably generally axially oriented relative to the rotational axis of the rotor 26 and extends lengthwise to present opposite inner and outer sides 164 and 166. The outer side 166 is preferably spaced from the outer wall 150 of the controller case 130 except where interconnected thereto via a pair of spacers 168, while an at least substantially unobstructed, open space 170 is provided between the inner side 164 and the inner wall 148 of the controller case 130. This dual-sided spacing is such that at least part of the flow path 162 extends along each of the first and second sides of the controller 124. That is, the flow path 162 includes inner and outer branches 172 and 174, respectively, extending generally axially along respective ones of the inner and outer sides 164 and 166 of the controller 124.

Alternatively described, the inner wall 148 of the controller case 130 and the inner side 164 of the controller 124 preferably cooperatively at least in part define the inner branch 172 of the flow path 162. The outer wall 150 of the controller case 130 and the outer side 166 of the controller 124 preferably cooperatively at least in part define the outer branch 174 of the flow path 162.

Furthermore, the sidewalls 152 and 154 of the controller case preferably additionally define the inner and outer branches 172 and 174 of the flow path 162.

Preferably, the controller inner and outer sides 164 and 166 are at least in part defined by the printed circuit board 126. More particularly, the board 126 preferably presents opposite inner and outer board faces 176 and 178, each of which defines (or at least in part defines) the corresponding one of the inner and outer sides 164 and 166 of the controller 124. The inner and outer board faces 176 and 178, as well as the electronic controller case 130 128 mounted thereon, are preferably all spaced from the controller case, with the spacers 168 engaging the outer board face 178.

The board 126 is preferably substantially flat, such that the inner and outer board faces 176 and 178 are substantially parallel. More particularly, the inner and outer board faces 176 and 178 preferably each extend generally axially and are generally parallel both to one another and to the inner and outer walls 148 and 150 of the controller case 130.

In a preferred embodiment, the spacers 168 are integrally formed with the controller case 130 (more particularly, with the outer wall 150 of the controller case 130) adjacent the fins 144, such that the controller 124 is spaced away from the fins 144. Yet further, the spacers 168 preferably comprise a thermally conductive material so as to thermally interconnect the controller 124 and the fins 144, enabling additional cooling of the controller 124. That is, the spacers 168 preferably act as heat sinks conductively drawing heat from the controller 124 and transmitting it to the fins 144. It is particularly noted that the preferred construction of the controller case 130 is such that the fins 144 are disposed outside the flow path 162. That is, any cooling function provided by the fins 144 is preferably independent of that provided by the fluid flow along the flow path 162.

Although the above-described spacer configuration is preferred, it is permissible according to some aspects of the present invention for portions of the controller to be in direct contact with one or more of the controller case inner and outer walls 148 and 150 or sidewalls 152 and 154. Furthermore, alternative spacers or spacer arrangements may be provided. For instance, the inner side of the printed circuit board might also be spaced from the controller case by one or more spacers.

In a preferred embodiment, the controller case 130 is configured such that fluid flow along the controller 124 is at least substantially unobstructed by the controller case 130. For instance, the controller case 130 is devoid of baffles, channels, orifices, or other structure designed to direct the fluid flow toward particular components of the controller 124. Rather, fluid at least substantially freely flows across, along, and about the entirety of the controller 124, with no special accommodations being made for targeted or particularly aggressive cooling of certain regions or components thereof.

As noted previously, in a broad sense, the flow director 160 preferably receives exhaust air from the blower 14 and, in cooperation with the controller 124, directs the fluid along the flow path 162. In more detail, the flow director 160 is preferably part of the housing 30 and, most preferably, is integrally formed with the lower endshield 78. Non-integral formation is permissible according to some aspects of the present invention, however.

It is also preferred that the flow director 160 includes at least part of the bottom wall 158 of the controller case 130. It is permissible according to some aspects of the present invention, however for the bottom wall of the controller case to instead be entirely independent of the flow director.

Preferably, the flow director 160 comprises a pair of radially spaced apart, inner and outer walls 180 and 182. The inner wall 180 is preferably generally circumferential and axially extending. In contrast, the outer wall 182 preferably includes distinct upper and lower portions 184 and 186, respectively. More particularly, the lower portion 186 is preferably generally circumferential and axially extending so as to be at least substantially parallel to the inner wall 180. The upper portion 184 preferably presents a generally arcuate or quarter-circular profile, with a radially extending segment 188 extending generally radially outwardly from the lower portion 186 and a generally axially extending segment 190 extending generally radially upwardly from the radially extending segment 188.

It is particularly noted that, while the generally curved profiles of the radially extending and axially extending segments 188 and 190, respectively, are conducive toward smooth fluid flow, it is permissible according to some aspects of the present invention for angular or mixed configurations to be used. For instance, rather than presenting a quarter-circular profile, as preferred, the upper portion might instead present a right-angled profile formed by straight, intersecting radially and axially extending segments.

In view of the above detailed description, it will be apparent to one ordinary skill in that art that the flow director 160 in a broad sense preferably includes an upstream portion 192 and an intermediate portion 194 immediately adjacent and downstream of the upstream portion 192.

The upstream portion 192 preferably includes a lower section 196 of the inner wall 180 and the lower portion 186 of the outer wall 182. The upstream portion 192 preferably defines a generally axially extending upstream portion 192 of the flow path 162.

The intermediate portion 194 preferably includes an upper section 200 of the inner wall 180 and the upper portion 184 of the outer wall 182. The intermediate portion 194 preferably defines generally radially and generally axially extending intermediate portions 202 and 204, respectively, of the flow path 162.

Finally, the controller case 130 and the controller 124 cooperatively at least substantially define a downstream portion 206 of the flow path 162, as described above in detail with respect to the definition of the inner and outer branches 172 and 174 of the flow path 162.

Thus, exhaust air from the blower 14 is preferably directed generally axially along the upstream portion 192 of the flow path 162 by the upstream portion 192 of the flow director 160. Part of the air then continues generally axially along the axially extending intermediate portion 194, while another part of the air is diverted in a general radial direction by the radially extending intermediate portion 194. As dictated primarily by the controller 124 and the controller case 130, the generally axially flowing air then continues generally axially along the inner branch 172 of the flow path 162. As dictated primarily first by the upper portion 184 of the outer wall 182 of the flow director 160 and thereafter by the controller 124 and the controller case 130, the generally radially flowing air is shifted from its generally radial direction in order to flow generally axially along the outer branch 174 of the flow path 162.

Preferably, the flow director 160 and the controller 124 directly engage each other along an interface 208. Furthermore, it is preferred that the flow path 162 is at least substantially unaffected by the presence of the interface 208. That is, an opening 210 defined at the interface 208 (and through which the flow path extends) preferably extends at least substantially unchanged to at least some extent in both axially upward and downward directions. Therefore, the interface 208 itself has negligible effect on fluid flow. (As will be apparent to one of ordinary skill in the art, fluid flow is indeed affected by the presence of the controller 124 immediately adjacent the interface 208. However, such effect is independent of and unrelated to the presence of the interface itself)

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A motor assembly for powering a blower operable to generate fluid flow, said motor assembly comprising:
    a motor;
    a controller assembly including—
        a controller configured to at least in part control the motor, and
        a controller case at least substantially housing the controller,
        said controller having a proximal end extending lengthwise to present opposite first and second sides at least in part spaced from the controller case; and
    a flow director operable to receive fluid flow from the blower,
    said flow director and said controller case being operable to cooperatively direct fluid received from the blower along a flow path,
    said flow path at least in part extending along each of the first and second sides of the controller,
    said flow director projecting outwardly relative to the proximal end of the controller such that the flow path extends directly from the flow director to each side of the controller.

2. The motor assembly as claimed in claim 1,
    said motor including a rotor rotatable about an axis,
    said first and second sides of the controller extending generally axially,
    said flow path extending generally axially along the first and second sides of the controller.

3. The motor assembly as claimed in claim 2,
    said flow path including a generally axially extending upstream portion, a generally axially extending downstream portion adjacent the first and second sides of the controller, and a generally radially extending intermediate portion fluidly interconnecting the upstream and downstream portions.

4. The motor assembly as claimed in claim 3,
    said flow director at least substantially defining the upstream and intermediate portions,
    said controller case and said controller cooperatively at least substantially defining the downstream portion.

5. The motor assembly as claimed in claim 1,
    said controller case configured such that fluid flow along the controller is at least substantially unobstructed by the controller case.

6. The motor assembly as claimed in claim 1,
    said controller case defining a plurality of heat-dispersing fins.

7. The motor assembly as claimed in claim 6,
    said fins being outside the flow path.

8. The motor assembly as claimed in claim 6,
    said controller case including a spacer spacing the controller away from the fins,
    said spacer thermally interconnecting the controller and the fins.

9. The motor assembly as claimed in claim 1,
    said motor including an endshield,
    said flow director and said endshield being integrally formed.

10. The motor assembly as claimed in claim 1,
    said flow director being configured to receive exhaust air from the blower.

11. The motor assembly as claimed in claim 1,
    said motor assembly being configured to power a vacuum blower wheel.

12. The motor assembly as claimed in claim 1,
    said motor being configured to be operable at temperatures up to about 85 degrees Celsius.

13. The motor assembly as claimed in claim 1,
    said controller comprising a printed circuit board.

14. The motor assembly as claimed in claim 13,
    said controller further comprising a field-effect transistor, a conductor, and a capacitor mounted on the printed circuit board.

15. The motor assembly as claimed in claim 13,
    said board presenting opposite inner and outer board faces, each of which defines at least in part a corresponding one of the sides of the controller.

16. The motor assembly as claimed in claim 15,
    said board being substantially flat such that the inner and outer board faces are substantially parallel.

17. The motor assembly as claimed in claim 16,
    said controller case presenting opposite walls that define in part the flow path.

18. The motor assembly as claimed in claim 17,
said walls being parallel to one another and to the inner and outer board faces.

19. The motor assembly as claimed in claim 18,
said motor including a rotor rotatable about an axis,
said walls and inner and outer board faces extending axially.

20. The motor assembly as claimed in claim 19, further comprising a motor case at least substantially housing the motor, one of said walls extending alongside the motor case.

21. The motor assembly as claimed in claim 1, further comprising:
electrically conductive connector wiring; and
a motor case at least substantially housing the motor,
said motor case defining an opening through which the connector wiring extends between the motor and the controller.

22. The motor assembly as claimed in claim 1,
said flow director and said controller case directly engaging each other along an interface,
said flow path being at least substantially unaffected by the interface.

* * * * *